(12) United States Patent
Frenne et al.

(10) Patent No.: US 12,192,991 B2
(45) Date of Patent: Jan. 7, 2025

(54) BEAMFORMING ASSISTANCE

(71) Applicant: Telefonaktiebolaget LM Ericsson (publ), Stockholm (SE)

(72) Inventors: Mattias Frenne, Uppsala (SE); Claes Tidestav, Bålsta (SE)

(73) Assignee: Telefonaktiebolaget LM Ericsson (PUBL) (SE)

( * ) Notice: Subject to any disclaimer, the term of this patent is extended or adjusted under 35 U.S.C. 154(b) by 560 days.

(21) Appl. No.: 17/280,536

(22) PCT Filed: Sep. 25, 2019

(86) PCT No.: PCT/EP2019/075938
§ 371 (c)(1),
(2) Date: Mar. 26, 2021

(87) PCT Pub. No.: WO2020/064878
PCT Pub. Date: Apr. 2, 2020

(65) Prior Publication Data
US 2022/0039124 A1 Feb. 3, 2022

Related U.S. Application Data

(60) Provisional application No. 62/738,476, filed on Sep. 28, 2018.

(51) Int. Cl.
*H04L 5/00* (2006.01)
*H04B 7/0413* (2017.01)
(Continued)

(52) U.S. Cl.
CPC ...... *H04W 72/1268* (2013.01); *H04B 7/0413* (2013.01); *H04B 7/0628* (2013.01); *H04W 72/23* (2023.01)

(58) Field of Classification Search
None
See application file for complete search history.

(56) References Cited

U.S. PATENT DOCUMENTS

2018/0199185 A1* 7/2018 Tenny ............... H04W 8/22
2018/0343653 A1* 11/2018 Guo ............... H04W 72/542
(Continued)

OTHER PUBLICATIONS

3GPP, "3rd Generation Partnership Project; Technical Specification Group Radio Access Network; NR; Physical layer procedures for data (Release 15)", 3GPP TS 38.214 V15.2.0, Jun. 2018, 1-94.
(Continued)

*Primary Examiner* — Sithu Ko
(74) *Attorney, Agent, or Firm* — Weisberg I.P. Law, P.A.

(57) ABSTRACT

The invention refers to a method in a user equipment, UE (100) of a wireless communications network, wherein the communications network provides a radio connection of the UE to a base station, gNB (200), comprising the steps of sending the gNB (200) UE capability information indicative of multiple input multiple output, MIMO, capabilities, receiving from the gNB (200) configuration information for a transmission configuration indication, TCI, state configuration associated to spatial quasi co-location, QCL, assistance, and receiving from the gNB (200) physical download control channel, PDCCH, information to determine PDSCH scheduling referring to the TCI state; the invention further refers to a corresponding method in a gNB, and to a corresponding UE and gNB.

20 Claims, 11 Drawing Sheets gNB 200

UE 100

(51) Int. Cl.
*H04B 7/06* (2006.01)
*H04W 16/28* (2009.01)
*H04W 72/1268* (2023.01)
*H04W 72/23* (2023.01)

(56) References Cited

U.S. PATENT DOCUMENTS

| | | | | |
|---|---|---|---|---|
| 2019/0141691 A1* | 5/2019 | Kwon | | H04L 5/00 |
| 2019/0297603 A1* | 9/2019 | Guo | | H04L 5/0053 |
| 2019/0306924 A1* | 10/2019 | Zhang | | H04B 7/063 |
| 2019/0320469 A1* | 10/2019 | Huang | | H04W 74/0833 |
| 2019/0364561 A1* | 11/2019 | Xiong | | H04W 76/27 |
| 2019/0394634 A1* | 12/2019 | Akkarakaran | | H04W 88/06 |
| 2020/0053767 A1* | 2/2020 | Bai | | H04W 72/23 |
| 2020/0119897 A1* | 4/2020 | Zhang | | H04W 72/12 |
| 2020/0128479 A1* | 4/2020 | Xu | | H04W 24/00 |
| 2021/0045141 A1* | 2/2021 | Lee | | H04L 5/0053 |
| 2021/0314045 A1* | 10/2021 | Cha | | H04W 16/28 |

OTHER PUBLICATIONS

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, 1-303.

Ericsson "Feature lead summary for beam management—Thursday", 3GPP TSG-RAN WG1 Meeting #94, Tdoc R1-1809864, Gothenburg, Aug. 20-24, 2018, 1-26.

Samsung, "Discussion on beam indication for PDSCH", 3GPP TSG RAN WG1 Meeting #90, R1-1714513, Prague, Czech, Jun. 21-25, 2017, 1-4.

Spreadtrum Communications, "Differential RSRP report and beam indication", 3GPP TSG RAN WG1 Meeting NR#3, R1-1715510, Nagoya, Japan, Sep. 18-21, 2017, 1-7.

* cited by examiner

BEAMFORMING ASSISTANCE

TECHNICAL FIELD

The present disclosure generally relates to wireless communication systems, and specifically relates to beamforming control in a 3GPP New Radio, NR, wireless communication network

DESCRIPTION

UEs operating at high carrier frequencies will utilize panel antennas, which have a high directivity; one UE may be equipped with several panel antennas, where each panel can receive from a limited set of directions. In contrast, UE antennas for lower carrier frequencies are typically omni-directional, meaning that one antenna can receive transmissions from all directions. One such antenna panel may also receive from number of directions, in specific beams.

Beamforming at the base station will also be increasingly used in modern communication. That is amongst others due the challenging propagation conditions at high carrier frequencies. Furthermore, since the antenna element size is proportional to the carrier wavelength, the antennas become smaller, which makes deployment of antenna arrays with many antenna elements possible. Such antenna arrays with a large number of antenna elements enable the base station to generate narrow and highly directional beams.

In a scenario with highly directional antennas at the base station, and antenna panels at the UE, a situation may occur, where the UE can only reliably receive the signal if it chooses the correct Rx beam. The base station cannot safely change transmit beam without informing the UE.

Commonly, at high frequencies such as >30 GHz (in 3GPP known as frequency range 2, or FR2), analog beamforming is used, in contrast to fully digital beamforming at lower frequency bands (e.g. around 2 GHz) known as frequency range 1, FR1. A frequency range may be regarded as a collection of a plurality of (frequency) bands (e.g. FR2: 24.25-52.6 GHz). Analog beamforming means that the multi-antenna precoder can be controlled by phase shifters, implemented by analog techniques, e.g. at IF or RF frequencies. In contrast, fully digital beamforming takes place at baseband.

It is to be noted that if the UE has an omni directional antenna system, for example many simultaneous RX beams distributed in all directions, then the base station can change the TX beam without informing the UE since the UE is always capable of receiving what was transmitted, provided that the signal strength over noise is large enough.

To solve the situation mentioned above, wherein the UE can only reliably receive the signal if it chooses the correct Rx beam, so-called beam indications have been introduced in 3GPP NR. The beam indications are transmitted from the base station to the UE, and at a certain point in time, the base station and UE update their beams, e.g., from beam 1 to beam 2.

3GPP specification TS 38.214, v.15.2.0 section 5.1.5 specifies a number of transmission configuration indicator, TCI, states containing parameters for configuring a quasi co-location (cql) relationship between one or two downlink reference signals and the DM-RS (Demodulation Reference Signal) ports of the PDSCH (Physical Downlink Shared Channel). The quasi co-location relationship is configured by the higher layer parameter qcl-Type1 for the first DL RS (download reference signal), and qcl-Type2 for the second DL RS (if configured). For the case of two DL RSs, the QCL types shall not be the same, regardless of whether the references are to the same DL RS or different DL RSs.

According to 3GPP specifications, two antenna ports are said to be quasi co-located if properties of the channel over which a symbol on one antenna port is conveyed can be inferred from the channel over which a symbol on the other antenna port is conveyed.

The quasi co-location types corresponding to each DL RS is given by the higher layer parameter qcl-Type in QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

Thus, according to above-mentioned 3GPP specification, beam indications indicative of spatial quasi co location, QCL, relations are being referred to as "QCL TypeD".

It is to be noted that CQL types A, B and C are not relevant for analog beamforming and the UE must always have assistance of these (even at midband and lowband operation). It is only Type D that is associated with analog beamforming.

Two transmitted signals being associated according to QCL TypeD essentially means that the first and second signal can be received with the same beam or spatial (RX) filter. This is valuable information to the UE, since if the UE has been trained to receive the first signal using a preferred RX beam, it knows that it can successfully receive the second signal by using the same RX beam. Typically, the first signal is a CSI-RS signal (i.e. a measurement signal) and second signals is a physical download shared channel, PDSCH, signal (i.e. a data transmission signal).

A beam indication when scheduling PDSCH may be information about a QCL Type D relation between the PDSCH DMRS (De-Modulation Reference Signal) to another (previously received) reference signal (RS). PDSCH DMRS is a special type of physical layer signal which functions as a reference signal for decoding PDSCH.

Moreover, the UE may receive different beam indications for difference signals. E.g., the UE may be provided with one beam indication to receive the data channel PDSCH and another beam indication for a CSI-RS signal. In specification language, the PDSCH DMRS is quasi co located with one RS and the CSI-RS is QCL with another RS.

According to 3GPP TS 38.214, V15.2.0, for the DM-RS ((dedicated) demodulation reference signals) of PDCCH, the UE shall expect that a TCI-State may indicate e.g. the following quasi co-location types:

'QCL-TypeA' with a channel-state information reference signal, CSI-RS, resource in a non-zero power, NZP-CSI-RS-ResourceSet configured with higher layer parameter trs-Info, and
'QCL-TypeD' with the same CSI-RS resource, when applicable.

The parameter trs-Info may indicate that the antenna port for all NZP-CSI-RS resources in the CSI-RS resource set is same.

This means that the PDCCH DMRS is associated with a TCI state (i.e. a configuration state), where the TCI state contains a NZP-CSI-RS-ResourceSet (i.e. a CSI-RS) which is QCL with the PDCCH DMRS with Type A (time and frequency parameters) and Type D (spatial parameters), when applicable.

A TCI state may contain two RSs, one for time/frequency QCL source (e.g. Type A) and one for spatial QCL source (Type D). The type D need not to be configured; particularly not needed when operating in FR1, this is the reason why 3GPP specifications states 'when applicable' as the specification covers operation in both FR1 and FR2.

The 3GPP specifications also includes a set of UE features. The UE features describe allowed limitations for the UE implementation of the standard. For instance, the standard may support several RS patterns, but for reducing complexity, the UE may choose not to implement all of them. The UE then signals to the network which RS patterns it supports, so that the network can take that information into account when configuring the RS patterns.

Some of these UE features may be relevant only for high frequencies, and may provide limitations e.g. on, adjustment time of the analog beamforming patterns.

In NR, the network may configure an additional QCL type, "type D" to assist the UE to use the correct RX beam when receiving data. This is important when the UE uses analog beamforming since the UE needs to know how to set the RX beam prior to receiving a data channel or measurement signal.

Currently, the network lacks knowledge, whether a UE needs QCL Type D assistance or not. Hence, the network doesn't know if the UE is configured to apply QCL Type D information. Thus, the network may always assume that QCL type D assistance is configured, even for those UEs that doesn't require such assistance; such assumption may lead to an excessive RS and signaling overhead.

SUMMARY

It is an object of embodiments of the specification to provide a flexible indication of QCL assistance information.

This object is achieved by the independent claims. Advantageous embodiments are described in the dependent claims and by the following description.

An embodiment refers to a method in a user equipment, UE, of a wireless communications network, wherein the communications network provides a radio connection of the UE to a base station, gNB (200), comprising: sending UE capability information indicative of multiple input multiple output, MIMO, capabilities, receiving configuration information for a transmission configuration indication, TCI, state configuration associated to spatial quasi co-location, QCL, assistance, and receiving physical download control channel, PDCCH, information to determine a physical download shared channel, PDSCH, scheduling referring to the TCI state.

Another embodiment refers a UE comprising a processor causing the radio access node to carry out the steps of: sending UE capability information indicative of multiple input multiple output, MIMO, capabilities, receiving configuration information for transmission configuration indication, TCI, state configuration associated to spatial quasi co-location, QCL, assistance, and receiving physical download control channel, PDCCH, information, to determine a PDSCH scheduling referring to the TCI state.

Another embodiment refers to a method in a base station, gNB, of a wireless communications network, wherein the communications network provides a radio connection of a UE to the gNB, comprising: receiving UE capability information indicative of multiple input multiple output, MIMO, capabilities, determining if the UE needs spatial QCL assistance, and sending configuration information for a transmission configuration indication, TCI, state configuration associated to spatial QCL assistance.

Another embodiment refers to a gNB comprising a processor causing the radio access node to carry out the steps of: receiving UE capability information indicative of multiple input multiple output, MIMO, capabilities, determining if UE needs spatial QCL assistance, and sending configuration information for a transmission configuration indication, TCI, state configuration associated to spatial quasi co-location, QCL, assistance.

According to embodiments, a UE may assume that QCL-TypeD is applicable depending on the reported UE capability. In other words, in such embodiment, QCL Type D is applicable when gNB has configured the UE with a source RS for Type D.

For an indication of applicability, existing UE capability signaling (for a certain band/range) may be used.

In an embodiment, the UE may indicate that it does not support multiple beam switches in a slot.

In an embodiment, if the UE indicates that it does not support RX beam sweeping using CSI-RS resource with repetition of the same TX beam, If the network receives such indication, the network may assume that RS with QCL Type D need not be configured to the UE.

In an embodiment, assistance may mean that source RS for QCL type D is configured, (in addition to a source RS for Type A or B or C), so in total two source RSs, per TCI state. Assistance may mean that the UE gets information about which beam the gNB will use for a scheduled data transmission. The gNB indicates a TCI state and the source RS for Type D in that TCI state is the reference. Whatever RX beam the UE used to receive this source RS in an earlier slot, the UE should use the same to receive the data. So, the UE gets some assistance on how to steer it's receive beam (i.e. implicitly information on which gNB TX beam is used).

In an embodiment, the indication that the UE does not need to be configured with QCL Type D type of QCL is inserted into (and thus reusing existing) UE capabilities relating to MIMO-ParametersPerBand field descriptions:

maxNumberRxBeam: The maximum number of Tx+Rx beam changes a UE can conduct during a slot across the whole band. If a maximum number 1 is indicated, the UE does not need to be configured with QCL Type D type of QCL source RS according to [TS 38.214]

maxNumberRxTxBeamSwitchDL: Recommended CSI-RS resource repetition number per resource set. If 'n1' is indicated, the UE does not need to be configured with QCL Type D type of QCL source RS according to [TS 38.214]

Embodiment concern a computer program comprising computer program code to be executed by a processor causing a radio network node to perform the steps of the above-described method, and a computer program storage medium.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Some of the embodiments contemplated herein will now be described more fully hereinafter with reference to the accompanying drawings.

Figure 1:
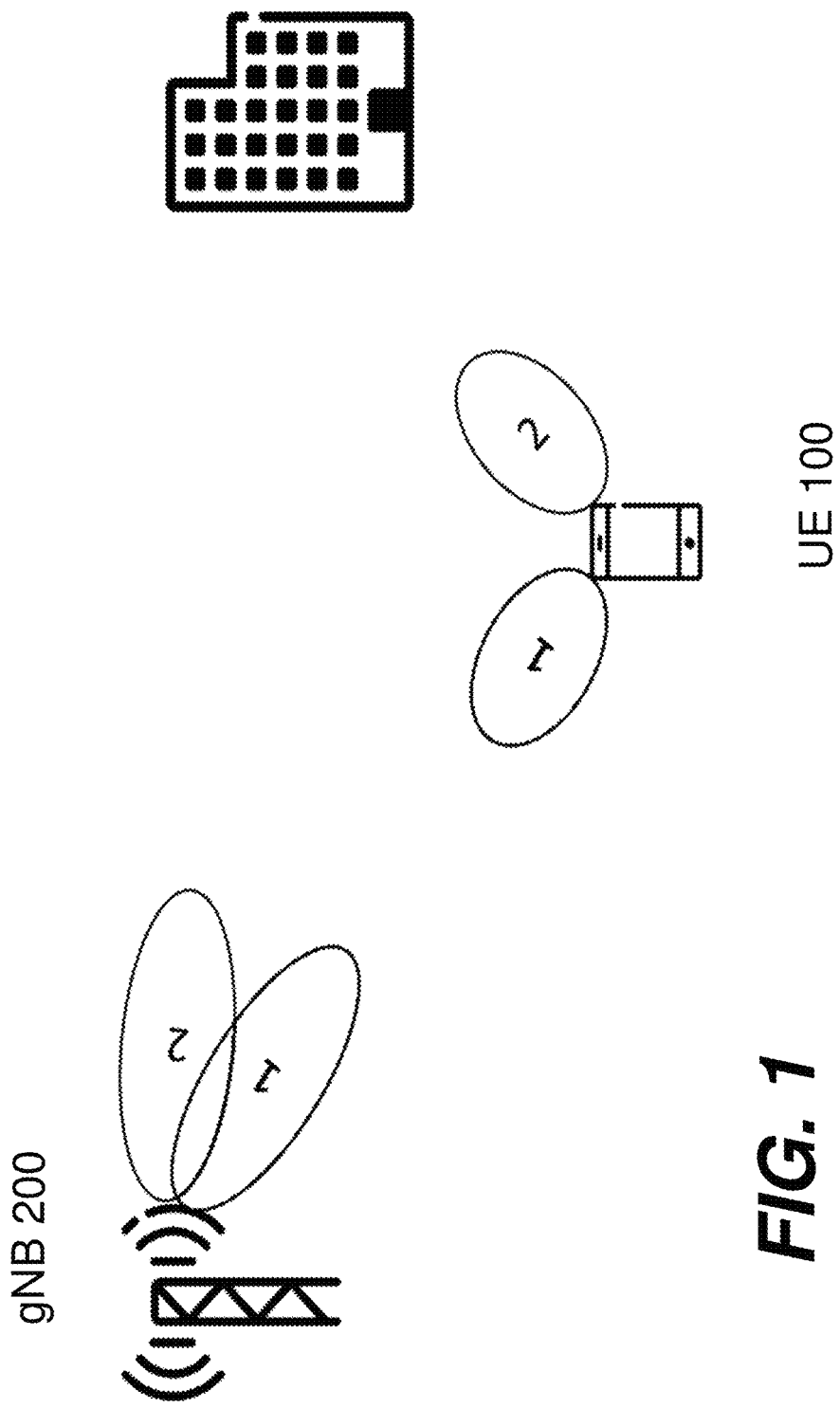
FIG. 1 illustrates a wireless network according to 3GPP communication by means of a plurality of TX and RX beams.

FIG. 1 illustrates an exemplary situation wherein the base station or gNB 200 transmits two different (transmit) beams Tx beam 1 and Tx beam 2. The UE 100 may only be able to reliably receive the signal transmitted in Tx beam 1 if it receives in Rx (reception) beam 1 and reliably receive the signal transmitted in Tx beam 2 if it receives in Rx beam 2.

As discussed above, beam indications are transmitted from the base station to the UE. At a certain time in point, the base station and UE may update their beams. Thereto, a beam indication may be sent from the base station to the UE. Both the base station and the UE then may switch from one beam to another e.g. from beam 1 to beam 2.

In 3GPP, the beam indications are defined as spatial QCL relations e.g. known as "QCL Type D".

Two transmitted signals may be associated according to QCL Type D. This essentially mean that the first and second signal can be received with the same beam or spatial (RX) filter. This is valuable information to the UE, since if it has been trained to receive the first signal using a preferred RX beam, then it knows it can receive the second signal successfully by using the same RX beam. Typically, the first and second signals are CSI-RS and PDSCH, i.e. a measurement signal and a data transmission, respectively.

A beam indication when scheduling PDSCH is thus information about a QCL Type D relation between the PDSCH DMRS to another (previously received) reference signal.

Moreover, the UE may receive different beam indications for difference signals. E.g., the UE may be provided with one beam indication to receive the data channel PDSCH and another beam indication for a CSI-RS signal. In specification language, the PDSCH DMRS is QCL with one RS and the CSI-RS is QCL with another RS.

Figure 2:
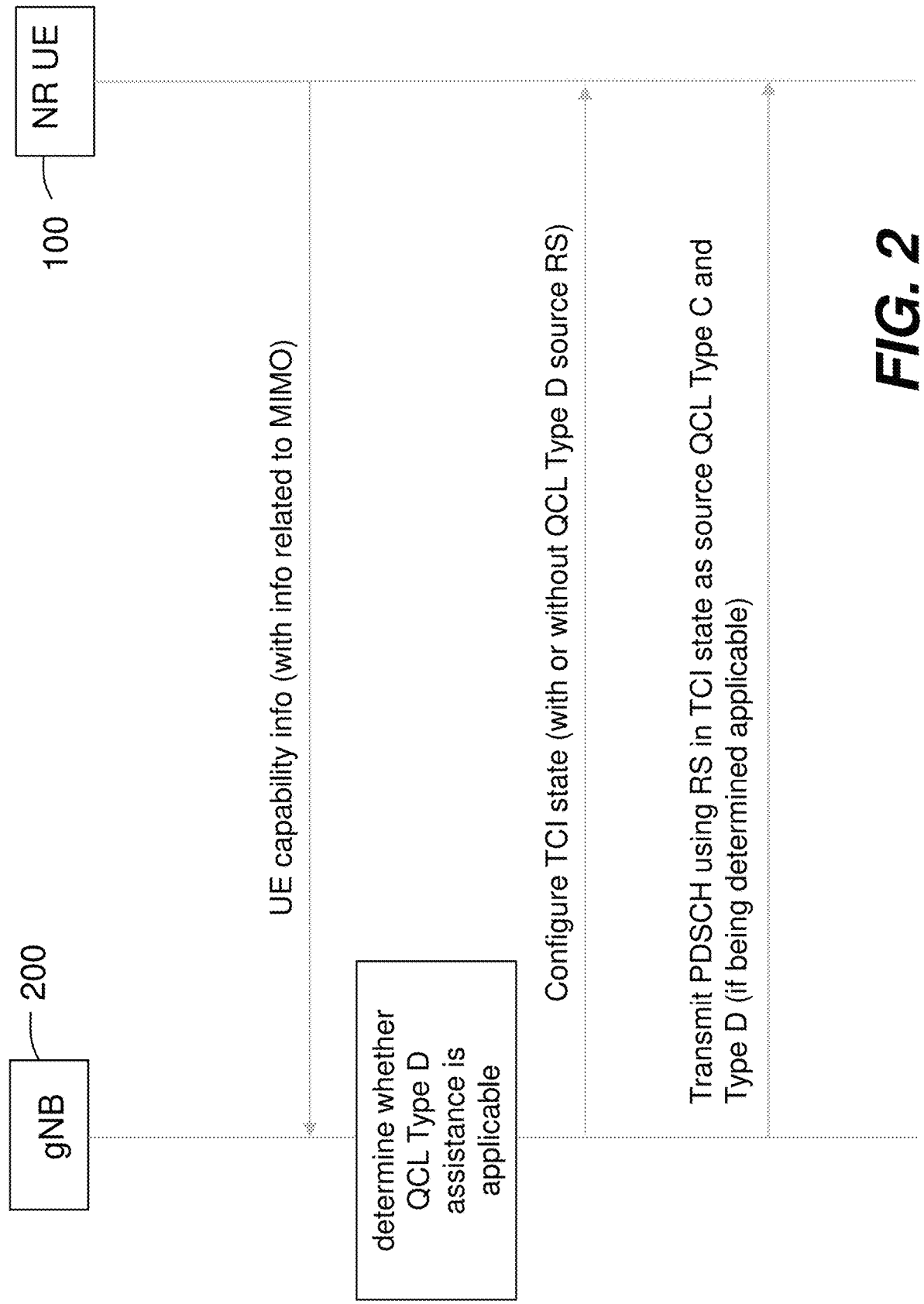
FIG. 2 illustrates a flow of messages to be exchanged between a UE and a RAN node for configuring QCL Type D assistance.

Referring to FIG. 2, the following exemplary messages may be exchanged between a base station, e.g. a gNB according to 3GPP 5G specifications) and a UE, e.g. a NR UE according to 3GPP 5G specifications).

The gNB receives from the UE capability information (related to MIMO).

Depending on the UE capability information (depending on whether CQL Type D is applicable), the gNB determines whether the UE needs QCL Type D assistance or not.

If the UE needs QCL Type D assistance, the gNB sends to the UE TCI state configuration information with QCL Type D source RS.

Otherwise, if the UE does not need no QCL Type D assistance, the gNB sends to the UE TCI state configuration information with QCL Type D source RS.

For the case that the gNB has determined that QCL Type D assistance is applicable the gNB may transmit PDSCH using RS in TCI state as source QCL Type C and Type D.

According to embodiments, the gNB may configure the UE by RRC signaling with up to 128 TCI states. Each TCI state is configured with a parameter qcl-Type1 to indicate the source RS for QCL of Type A, B or C and this RS is used by the UE to perform time and/or frequency synchronization. Each TCI state may additionally and optionally be configured with a second source RS, in qcl-Type2 parameter, and when configured to a TCI state, this source RS is used as the reference for QCL of Type D, i.e. the spatial reference, used by the UE to determine the RX beam the UE can assume when this TCI state is selected. When qcl-Type2 is configured, then it is said that QCL Type D is applicable.

Hence, when QCL Type D is applicable, it is expected that all configured TCI states all have a qcl-Type2 parameter in addition to the qcl-Type1 parameter which always is present. When QCL Type D is not applicable, then only qcl-Type1 is configured to each TCI state.

In addition, the PDCCH that schedules PDSCH can have up to 3 bits to select one TCI state. If more than 8 TCI states have been configured by RRC, then MAC CE (medium access control—control element) signaling from the gNB to the UE is used to down select to at most 8 "activated" DCI states of which the DCI carried by PDCCH subsequently can select one TCI state when scheduling PDSCH using the 3 bits in DCI.

The gNB then schedules the UE a PDSCH by transmitting a PDCCH containing a DCI (downlink control indicator or downlink control information) which has up to three bits included that refers to a TCI state that previously has been configured by RRC or RRC+MAC-CE.

Figure 3:
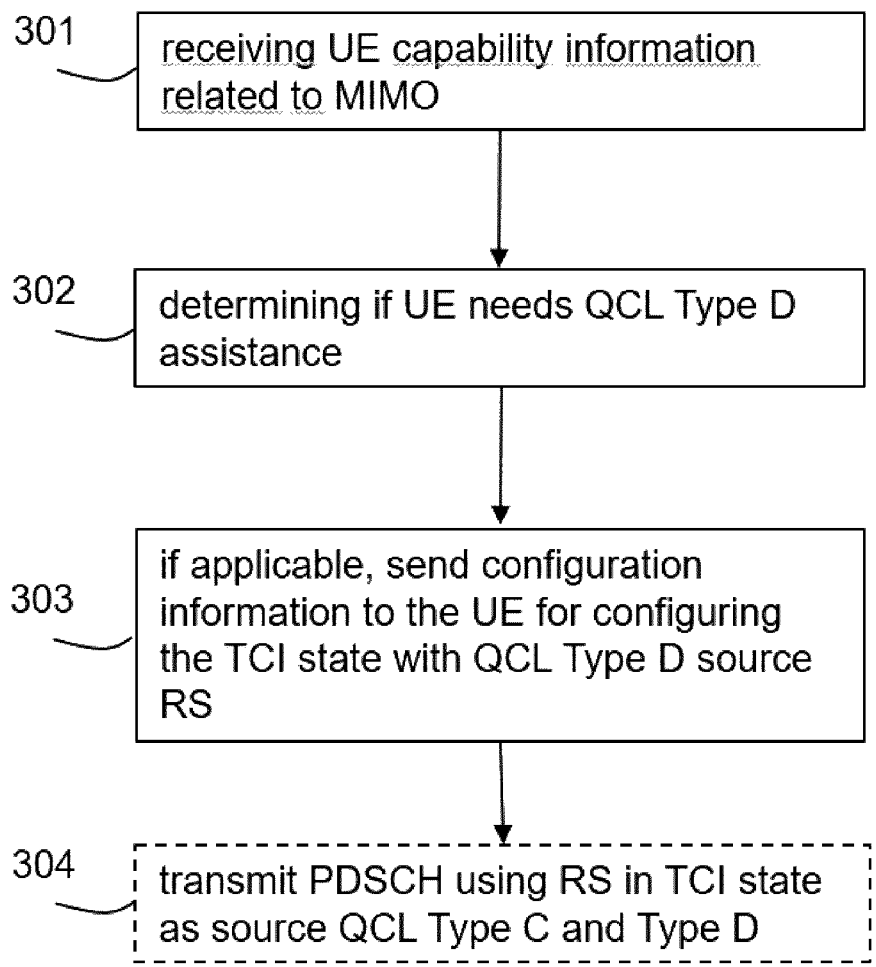
FIG. 3 is a flow chart of an exemplary method performed in a RAN node to configure a UE with QCL type D assistance.

Referring to FIG. 3, the following exemplary may be performed by the gNB:

The gNB receives from the UE capability information (related to MIMO).

Depending on the UE capability information, the gNB determines whether the UE needs QCL Type D assistance or not.

If the UE needs QCL Type D assistance, the gNB sends to the UE TCI state configuration information with QCL Type D source RS.

(Otherwise, if the UE does not need no QCL Type D assistance, the gNB sends to the UE TCI state configuration information with QCL Type D source RS.)

For the case that the gNB has determined that QCL Type D assistance is applicable the gNB may transmit PDSCH using RS in TCI state as source QCL Type C and Type D.

Figure 4:
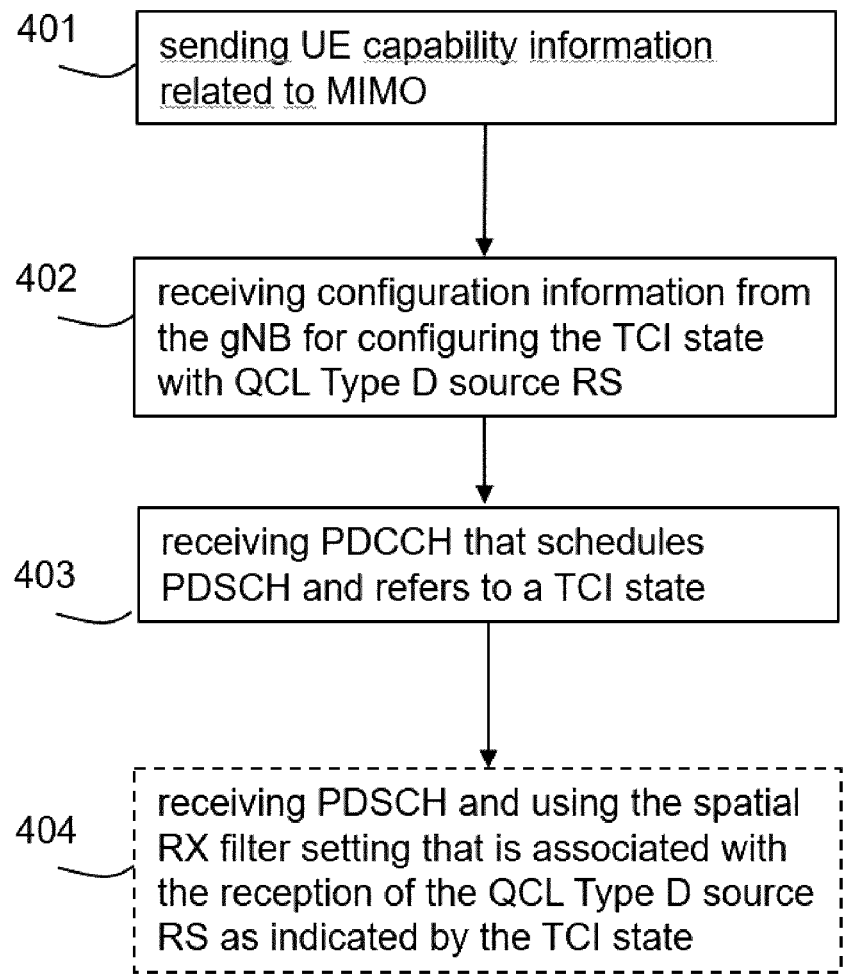
FIG. 4 is a flow chart of an exemplary method performed in a UE configure the UE with QCL type D assistance.

Referring to FIG. 4, the following exemplary may be performed by the UE:

The UE sends capability information (with respect to MIMO) to the gNB (wherein the capability information is indicative of whether the UE needs QCL Type D assistance or not).

The UE receives configuration information from the gNB for configuring the TCI state with QCL Type D source RS.

The UE receiving PDCCH that schedules PDSCH and refers to a TCI state.

In the following, the UE then may receive PDSCH signals and use the spatial RX filter setting that is associated with the reception of the QCL Type D source RS as indicated by the TCI state.

TCI state with QCL Type D source RS may mean a signaling indicative of A previously transmitted signal for which the UE can determine a spatial RX parameter:

In an embodiment, the UE capability information may use existing UE capability signaling for a certain band, that it does not support multiple beam switches in a slot, or it may indicate that it does not support RX beam sweeping using CSI-RS resource with repetition of the same TX beam. The network that can assume that RS with QCL Type D need not be configured to the UE.

In an embodiment, the UE capability information may comprise in indication whether the UE requires type D assistance to the UE capability signaling. By way of example, such information may be added to the MIMO-ParametersPerBand field description (as of feature group, FG, 2-27)

According to current NR specification, the UE capability signaling contains two items that are related to analog beamforming:
Feature Group (FG) 2-27, "Beam switching" for FR2
Indicates the maximum number of Tx+Rx beam changes a UE can conduct during a slot across the whole band component carrier B (B_Total).
Candidate value set: {4, 7, 14} switches
This number is defined as per subcarrier spacing
Feature Group (FG) 2-26, "Receiving beam selection using CSI-RS resource repetition "ON"
Indicates that the UE support Rx beam switching procedure using CSI-RS resource repetition "ON"
Recommended CSI-RS resource repetition number per resource set where candidate value set {2, 3, 4, 5, 6, 7, 8} repetitions FG 2-27 implies that the UE can perform beam switching at least 4 times in a slot and FG 2-26 indicates that the UE can perform RX beam switching in case the CSI-RS resource is configured with repetition. The latter implies that the gNB is transmitting the same beam at least two times so that the UE can try at least two different (analog) RX beams.

In an embodiment, it is suggested that when a UE reports compliance (support) with one or both of these feature groups, then network can assume that QCL Type D assistance should be configured, hence QCL Type D is applicable. If the UE does not report compliance with one or both of these feature groups, the network can assume that the QCL Type D assistance does not need to be configured.

In another embodiment, the current candidate value set of FG 2-27 is extended to include a value indicative of "no need for QCL Type D assistance". For example, the value "1" can be added, such that a new FG 2-27 contains a Candidate value set: {1, 4, 7, 14} switches, which, if indicated to the network, means UE doesn't need to make any switches since it need to QCL Type D assistance, or:
FG 2-26 contains a following Candidate value set: {1, 3, 4, 5, 6, 7, 8} repetitions, which, if 1 repetition is indicated to the network, this may mean that UE need no TX beam switches from the network and this is interpreted as no QCL type D assistance.

Figure 5:
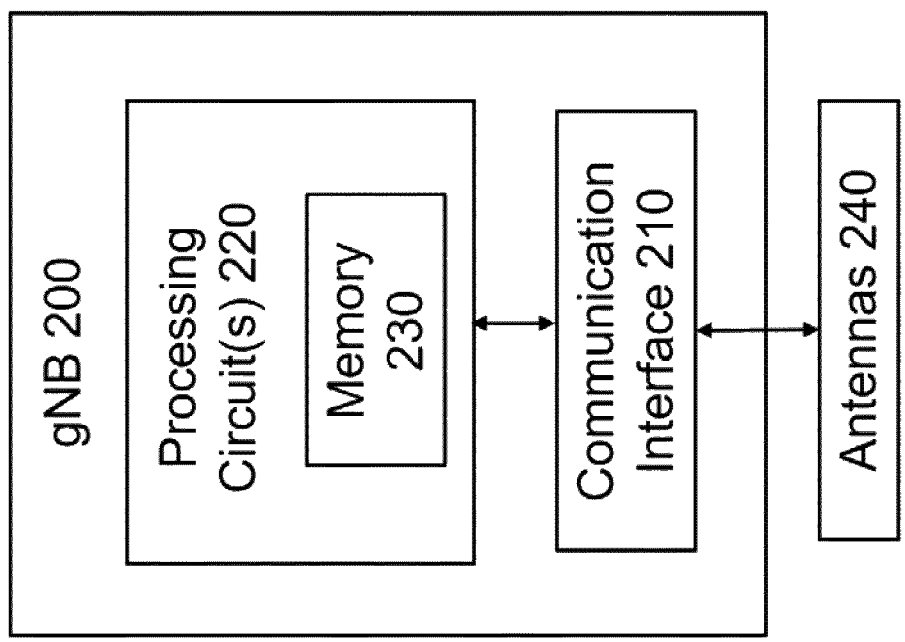
FIG. 5 is a block diagram illustrating exemplary physical blocks of a gNB.

Therewith the network knows whether a UE needs QCL Type D assistance or not. It thus knows when Type D is "applicable" (QCL type D assistance must therefore only be assumed and configured for UEs that require such assistance, which avoids RS and signaling overhead is cases where such signaling is not necessary FIG. 5 illustrates an example radio network node or gNB 200 according to one or more embodiments. The radio network node is configured to implement embodiments to configure QCL Type D assistance as described above.

The radio network node may comprise one or more processing circuits 220 configured to implement processing such as by implementing functional means or units for performing one or more aspects described above. In one embodiment, for example, the processing circuit(s) 220 implements functional means or units as respective circuits. The circuits in this regard may comprise circuits dedicated to performing certain functional processing and/or one or more microprocessors in conjunction with memory 230. In embodiments that employ memory 230, which may comprise one or several types of memory such as read-only memory (ROM), random-access memory, cache memory, flash memory devices, optical storage devices, etc., the memory 230 stores program code that, when executed by the one or more for carrying out one or more microprocessors, carries out the techniques described herein.

In embodiments, the radio network node also comprises one or more communication interfaces 210. The one or more communication interfaces 210 include various components (e.g., antennas 240) for sending and receiving data and control signals. More particularly, the interface(s) 210 include a transmitter that is configured to use known signal processing techniques, typically according to one or more standards, and is configured to condition a signal for transmission (e.g., over the air via one or more antennas 240). Similarly, the interface(s) include a receiver that is configured to convert signals received (e.g., via the antennas 240) into digital samples for processing by the one or more processing circuits. The transmitter and/or receiver may also include one or more antennas 240. By utilizing the communication interface(s) 210 and/or antenna(s) 240, the radio network node is able to communicate with other devices to transmit QoS data flows as well as the manage the mapping of these flows to radio bearers, remap the flows to different bearers, and/or remove the flows entirely.

Figure 6:
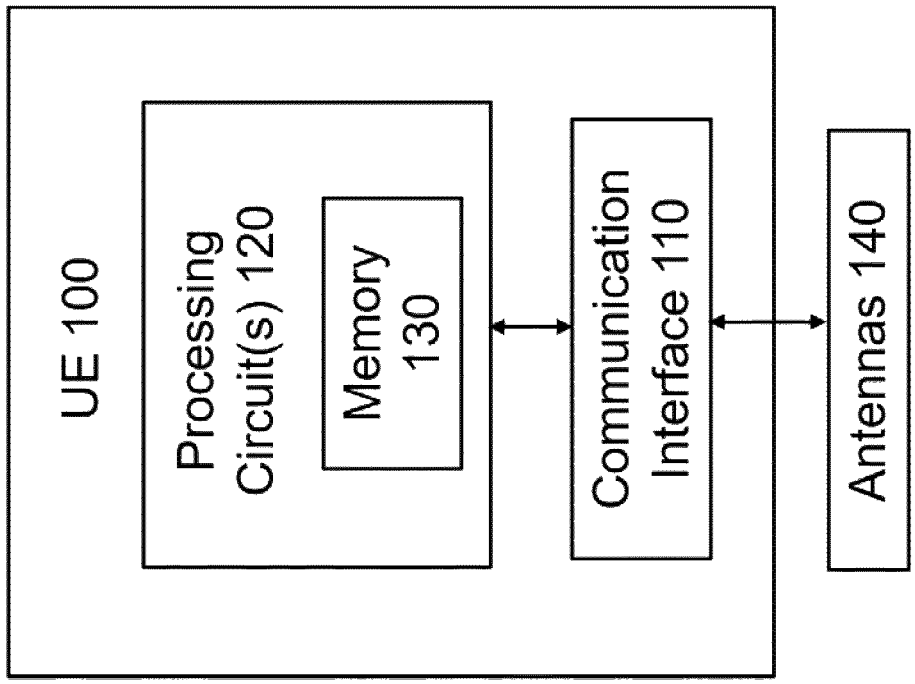
FIG. 6 is a block diagram illustrating exemplary physical blocks of a UE.

FIG. 6 illustrates an example UE 100 according to one or more embodiments. The UE is configured to implement embodiments to configure QCL Type D assistance as described above.

The UE may comprise one or more processing circuits 120 configured to implement processing such as by implementing functional means or units for performing one or more aspects described above. In one embodiment, for example, the processing circuit(s) 120 implements functional means or units as respective circuits. The circuits in this regard may comprise circuits dedicated to performing certain functional processing and/or one or more microprocessors in conjunction with memory 130. In embodiments that employ memory 130, which may comprise one or several types of memory such as read-only memory (ROM), random-access memory, cache memory, flash memory devices, optical storage devices, etc., the memory 130 stores program code that, when executed by the one or more for carrying out one or more microprocessors, carries out the techniques described herein.

In embodiments, the UE also comprises one or more communication interfaces 110. The one or more communication interfaces 110 include various components (e.g., antennas 140) for sending and receiving data and control signals. More particularly, the interface(s) 210 include a transmitter that is configured to use known signal processing techniques, typically according to one or more standards, and is configured to condition a signal for transmission (e.g., over the air via one or more antennas 140). Similarly, the interface(s) include a receiver that is configured to convert signals received (e.g., via the antennas 140) into digital samples for processing by the one or more processing circuits. The transmitter and/or receiver may also include a plurality of antennas 140. By utilizing the communication interface(s) 110 and/or antennas 240, the UE is able to communicate with the gNB as well as manage the mapping of these flows to radio bearers, remap the flows to different bearers, and/or remove the flows entirely.

Those skilled in the art will also appreciate that embodiments herein further include corresponding computer programs. A computer program comprises instructions which, when executed on at least one processor of a network node, cause the device or devices to carry out any of the respective processing described above. Furthermore, the processing or functionality may be considered as being performed by a single instance or device or may be divided across a plurality of instances that may be present in a given wireless system such that together the device instances perform all disclosed functionality.

Embodiments further include a carrier containing such a computer program. This carrier may comprise one of an electronic signal, optical signal, radio signal, or computer readable storage medium. A computer program in this regard may comprise one or more code modules corresponding to the means or units described above.

An access network node or RAN node herein can be any type node that is capable of communicating with another node over radio signals, e.g. a gNB according to 3GPP 5G specifications, an eNB according to 3GPP 4G specifications, or a NodeB according to other 3GPP specifications. Such node may also be generally referred to as access point or base station.

A UE is any type device capable of communicating with a radio network node over radio signals, such as, but not limited to, a device capable of performing autonomous wireless communication with one or more other devices, including a machine-to-machine (M2M) device, a machine-type communications (MTC) device, a user equipment (UE) (it should be noted that the UE does not necessarily have a "user" in the sense of an individual person owning and/or operating the device).

A UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, and wireless customer-premises equipment (CPE). In the discussion herein, a UE may encompass also equipment configured to transmit and/or receive data without human interaction such as machine-to-machine (M2M) devices, machine-type communication (MTC) devices, and (wireless) sensors.

In the present description, current 3GPP terminology is being preferably used. It is to be noted that 3GPP may change terminology without departing from the current principles.

It is to be noted that although the embodiments described herein focus on the NR radio interface, the same principles may be applicable also to LTE nodes showing a similar (functional and/or structural) structure.

Figure 7:
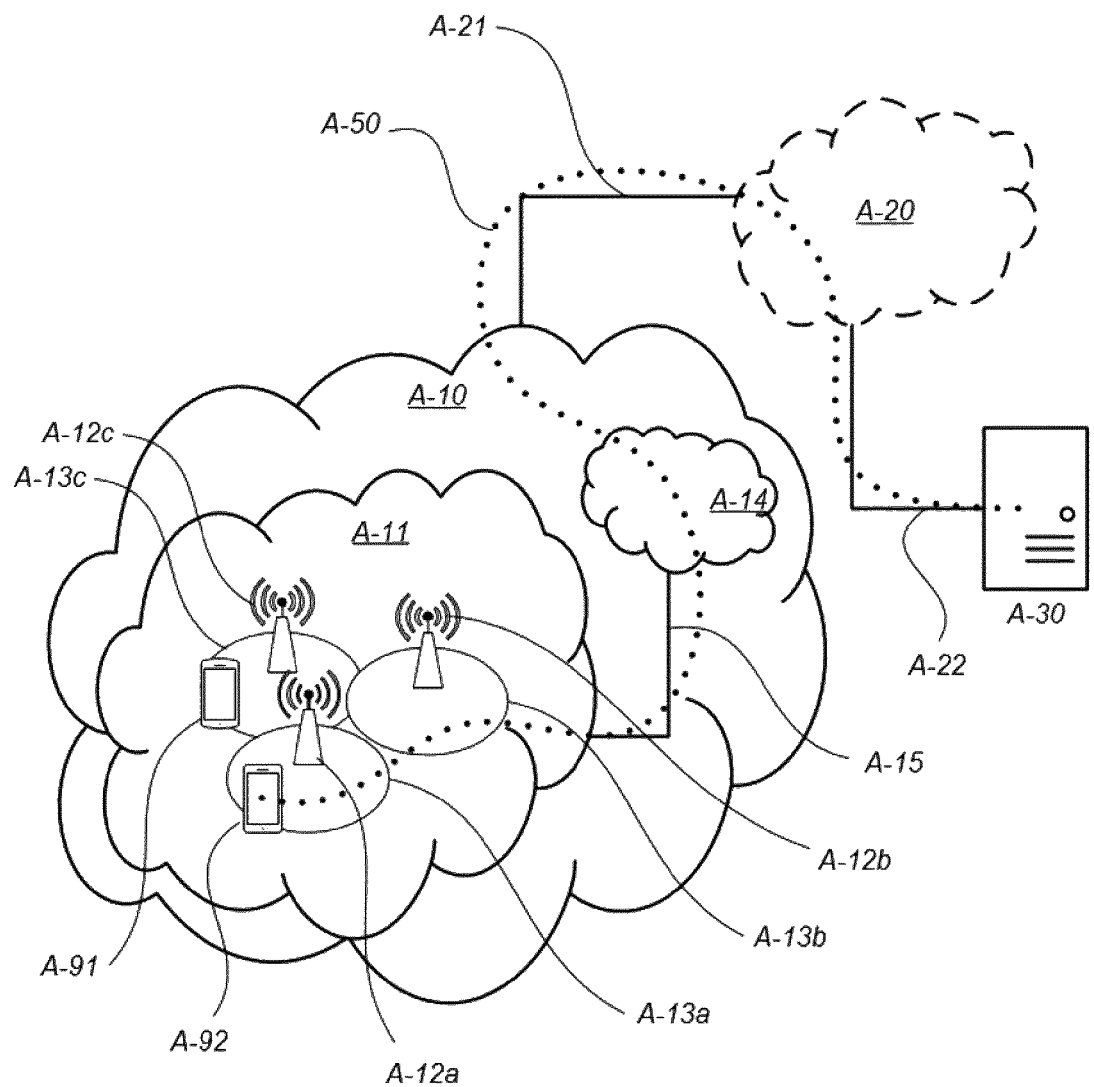
FIG. 7 schematically illustrates a telecommunication network connected via an intermediate network to a host computer.

FIG. 7 schematically illustrates a telecommunication network connected via an intermediate network to a host computer. With reference to FIG. 7, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points, each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment (UE) A-91 located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider, may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks (not shown).

The communication system of FIG. 7 as a whole enables connectivity between one of the connected UEs A-91, A-92 and the host computer A-30. The connectivity may be described as an over-the-top (OTT) connection A-50. The host computer A-30 and the connected UEs A-91, A-92 are configured to communicate data and/or signaling via the OTT connection A-50, using the access network A-11, the core network A-14, any intermediate network A-20 and possible further infrastructure (not shown) as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded (e.g., handed over) to a connected UE A-91. Similarly, the base station A-12 need not be aware of the future routing of an outgoing uplink communication originating from the UE A-91 towards the host computer A-30.

Figure 8:
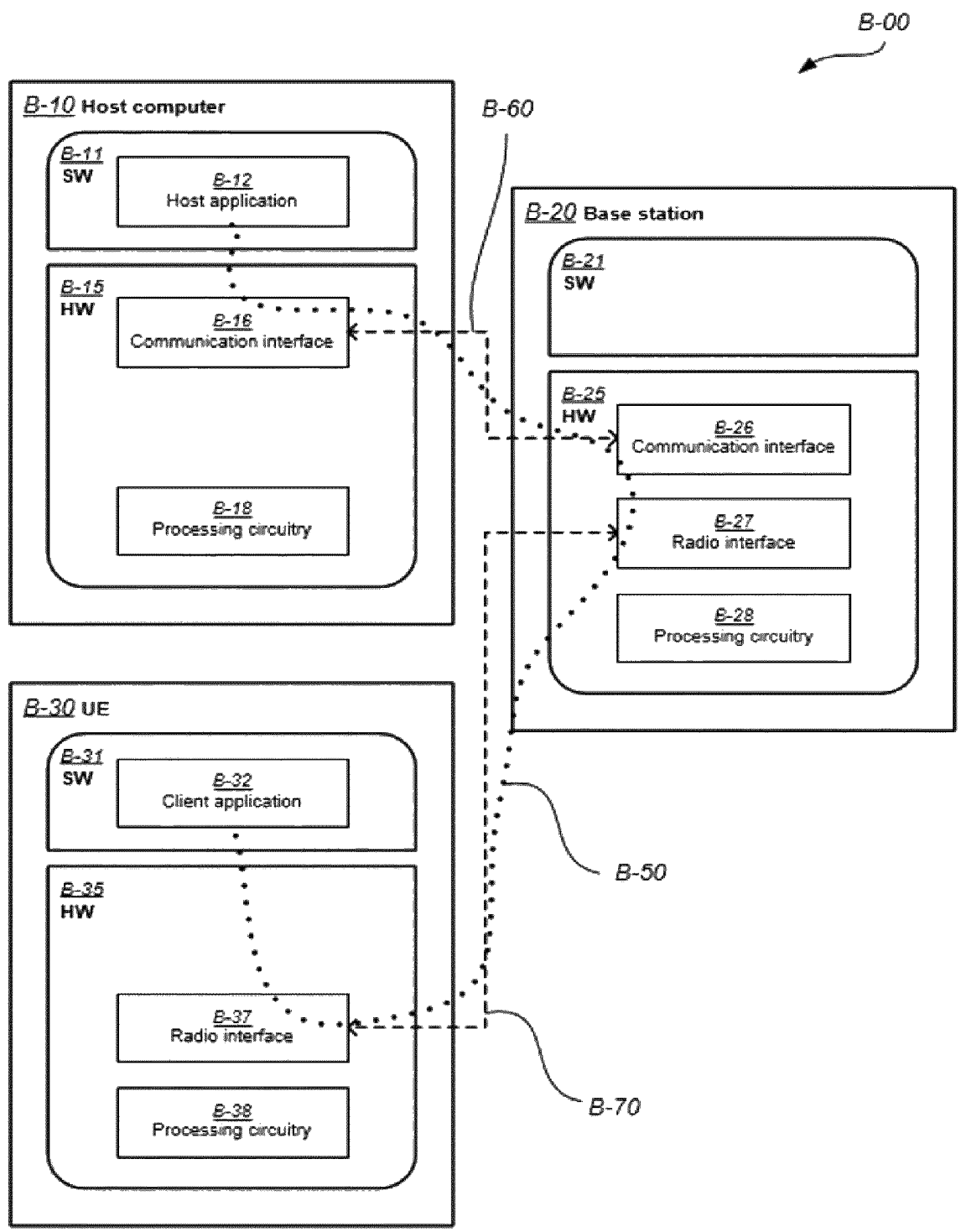
FIG. 8 is a generalized block diagram of a host computer communicating via a base station with a user equipment over a partially wireless connection.

Example implementations, in accordance with an embodiment, of the UE, base station and host computer discussed in the preceding paragraphs will now be described with reference to FIG. 8. FIG. 8 is a generalized block Diagram of a host computer communicating via a base station with a user equipment over a partially wireless connection.

With reference to FIG. 8, in a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these (not shown) adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area (not shown in FIG. 8) served by the base station B-20.

The communication interface B-26 may be configured to facilitate a connection B-60 to the host computer B-10. The connection B-60 may be direct or it may pass through a core network (not shown in FIG. 8) of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these (not shown) adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these (not shown) adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

It is noted that the host computer B-10, base station B-20 and UE B-30 illustrated in FIG. 8 may be identical to the host computer A-30, one of the base stations A-12a, A-12b, A-12c and one of the UEs A-91, A-92 of FIG. 7, respectively. This is to say, the inner workings of these entities may be as shown in FIG. 8 and independently, the surrounding network topology may be that of FIG. 7.

In FIG. 8, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing (e.g., on the basis of load balancing consideration or reconfiguration of the network).

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors (not shown) may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 10, 11, 12, and 13 are flowcharts illustrating methods implemented in a communication system including a host computer, a base station and a user equipment.

Figure 9:
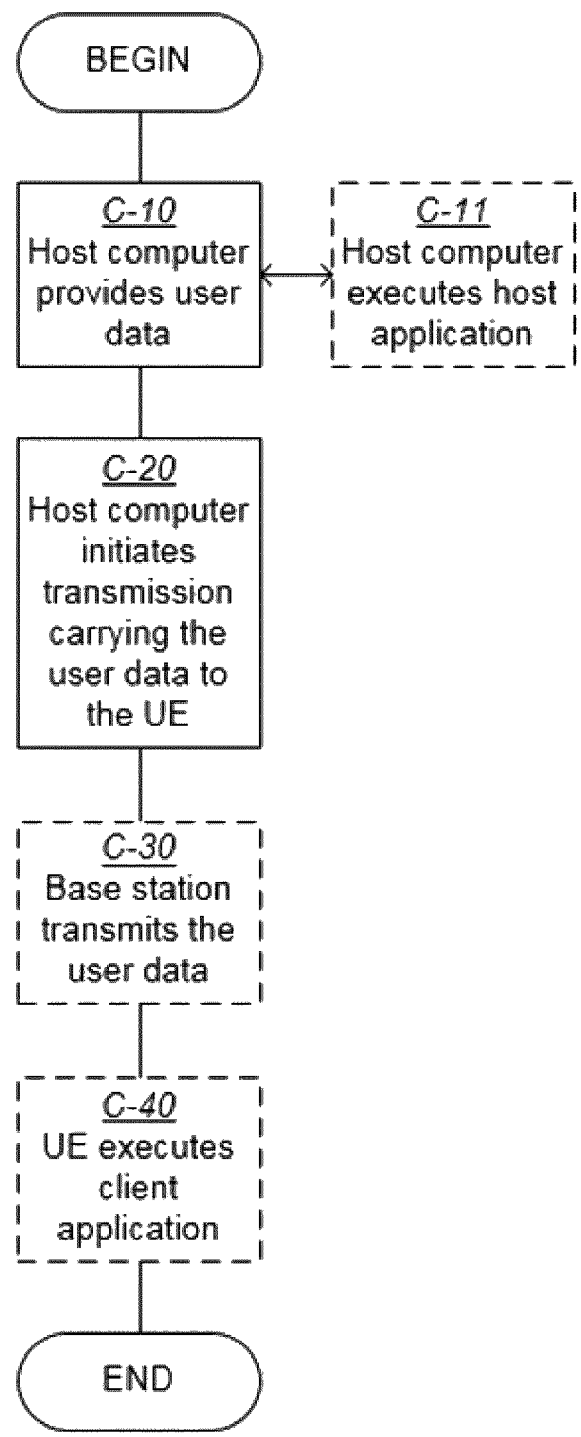
FIGS. 9 to 12 are flowcharts illustrating methods implemented in a communication system including a host computer, a base station and a user equipment.

FIG. 9 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 9 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 10:
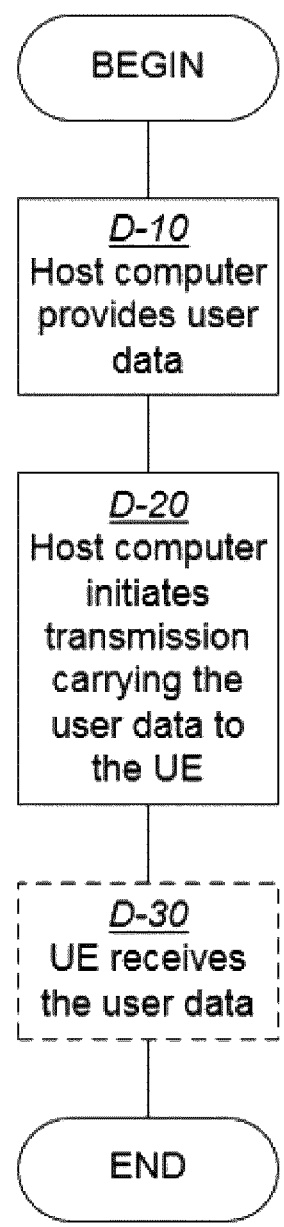

FIG. 10 is a flowchart illustrating a method implemented in a communication system, in accordance with one embodiment.

The communication system includes a host computer, a base station and a UE which may be those described with reference to FIGS. 8 and 9. For simplicity of the present disclosure, only drawing references to FIG. 10 will be included in this section. In a first step D-10 of the method, the host computer provides user data.

In an optional substep (not shown) the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

Figure 11:
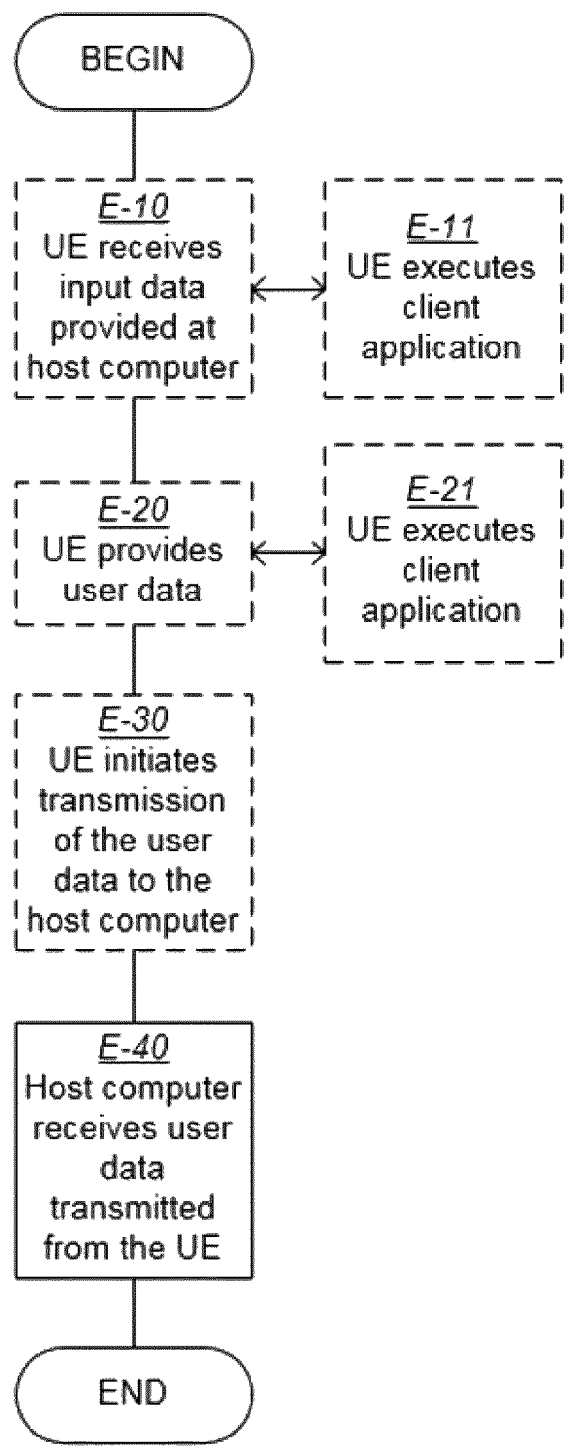

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 12:
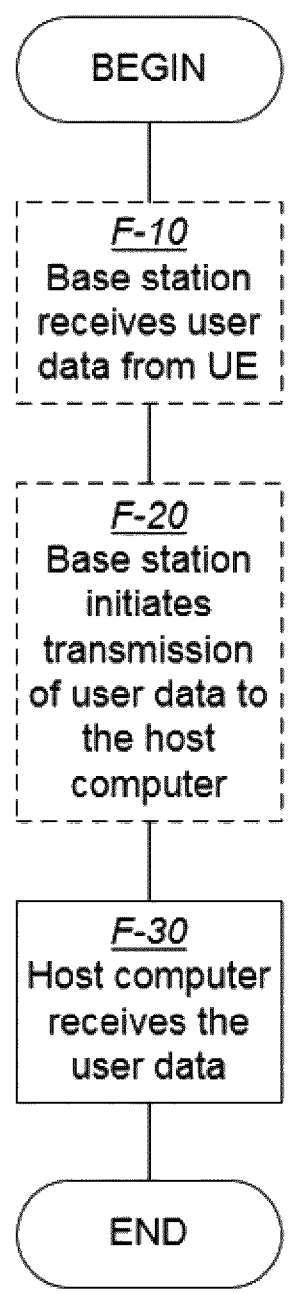

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

The corresponding additions (underlined) may be added to above-cited 3GPP document TS 38.214:

5.1.5 Antenna Ports Quasi Co-Location

The UE can be configured with a list of up to M TCI-State configurations within the higher layer parameter PDSCH-Config to decode PDSCH according to a detected PDCCH with DCI intended for the UE and the given serving cell, where M depends on the UE capability. Each TCI-State contains parameters for configuring a quasi co-location relationship between one or two downlink reference signals and the DM-RS ports of the PDSCH. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'QCL-TypeA': {Doppler shift, Doppler spread, average delay, delay spread}
 'QCL-TypeB': {Doppler shift, Doppler spread}
 'QCL-TypeC': {Doppler shift, average delay}
 'QCL-TypeD': {Spatial Rx parameter}

A UE May Assume that QCL-TypeD is Applicable Depending on the Reported UE Capability [12, TS 38.331].

Corresponding additions (underlined) may be added to above-cited 3GPP document TS 38.331:

5.1.1.1 MIMO-ParametersPerBand

The IE MIMO-ParametersPerBand is used to convey MIMO related parameters specific for a certain band (not per feature set or band combination).

| MIMO-ParametersPerBand information element |
|---|
| -- ASN1START |
| -- TAG-MIMO-PARAMETERSPERBAND-START |
| MIMO-ParametersPerBand ::= SEQUENCE { |
| [..] |
|   maxNumberRxBeam        INTEGER (1<u>2</u>..8) OPTIONAL, |
|   maxNumberRxTxBeamSwitchDL  SEQUENCE { |
|     scs-15kHz           ENUMERATED {<u>n1</u>,n4, n7, n14} OPTIONAL, |
|     scs-30kHz           ENUMERATED {<u>n1</u>,n4, n7, n14} OPTIONAL, |
|     scs-60kHz           ENUMERATED {<u>n1</u>,n4, n7, n14} |

-continued

| MIMO-ParametersPerBand information element | |
|---|---|
| OPTIONAL, | |
| scs-120kHz          OPTIONAL, | ENUMERATED {n1,n4, n7, n14} |
| scs-240kHz          OPTIONAL | ENUMERATED {n1,n4, n7, n14} |
| }       OPTIONAL, | |
| [...] | |
| } | |
| -- ASN1STOP | |
| -- TAG-MIMO-PARAMETERSPERBAND-STOP | |

MIMO-ParametersPerBand field descriptions
maxNumberRxBeam
The maximum number of Tx + Rx beam changes a UE can conduct during a slot across the whole band. If 1 is indicated, the UE does not need to be configured with QCL Type D type of QCL source RS according to [TS 38.214]
maxNumberRxTxBeamSwitchDL
Recommended CSI-RS resource repetition number per resource set. If 'n1' is indicated, the UE does not need to be configured with QCL Type D type of QCL source RS according to [TS 38.214]

Defining the Term "when Applicable":

Currently, there is no way for the network to know whether a UE needs QCL Type D assistance or not (unless in FR1, where QCL type D assistance is not applicable). Hence, network doesn't know when Type D is "applicable" and QCL type D assistance must therefore always be assumed and configured, even for UEs that doesn't require such assistance, which leads to excessive RS and signaling overhead.

If the UE indicates, using existing UE capability signaling for a certain band, that it does not support multiple beam switches in a slot or if it indicates that it does not support RX beam sweeping using CSI-RS resource with repetition of the same TX beam, then the network can assume that RS with QCL Type D need not be configured to the UE.

Hence, we propose that whether UE requires type D assistance is part of the UE capability signaling and we suggest one of the MIMO-ParametersPerBand field descriptions as follows to be discussed in UE capability discussions:

FG 2-27: maxNumberRxTxBeamSwitchDL, add value 'n1' and if "1" is indicated, then the UE does not need to be configured with QCL Type D type of QCL source RS (no QCL type D assistance needed). If "4", "7" or "14" is indicated, then the UE should be configured with QCL Type D type of QCL source RS (QCL type D assistance needed)

Further exemplary embodiments are listed in the following:

A-1. A base station configured to communicate with a user equipment (UE), the base station comprising a radio interface and processing circuitry configured to perform aspects of example embodiments described throughout the present disclosure.

A-2. A communication system including a host computer comprising:
  processing circuitry configured to provide user data; and
  a communication interface configured to forward the user data to a cellular network for transmission to a user equipment (UE),
    wherein the cellular network comprises a base station having a radio interface and processing circuitry, the base station's processing circuitry configured to perform aspects of example embodiments described throughout the present disclosure, including aspects related to forwarding the user data to the UE.

A-3. The communication system of embodiment A-2, further including the base station.

A-4. The communication system of embodiment A-3, further including the UE, wherein the UE is configured to communicate with the base station.

A-5. The communication system of embodiment A-4, wherein:
  the processing circuitry of the host computer is configured to execute a host application, thereby providing the user data; and
  the UE comprises processing circuitry configured to execute a client application associated with the host application.

A-6. A method implemented in a base station, comprising aspects of example embodiments described throughout the present disclosure, including aspects related to transmitting user data to a UE.

A-7. A method implemented in a communication system including a host computer, a base station and a user equipment (UE), the method comprising:
  at the host computer, providing user data; and
  at the host computer, initiating a transmission carrying the user data to the UE via a cellular network comprising the base station, wherein the base station is configured to perform aspects of example embodiments described throughout the present disclosure, included aspects related to transmitting the user data to the UE.

A-8. The method of embodiment A-7, further comprising:
  at the base station, transmitting the user data.

A-9. The method of embodiment A-8, wherein the user data is provided at the host computer by executing a host application, the method further comprising:
  at the UE, executing a client application associated with the host application.

A-10. A user equipment (UE) configured to communicate with a base station, the UE comprising a radio interface and processing circuitry configured to perform aspects of example embodiments described throughout the present disclosure, including aspects related to receiving user data from the base station.

A-11. A communication system including a host computer comprising:
  processing circuitry configured to provide user data; and
  a communication interface configured to forward user data to a cellular network for transmission to a user equipment (UE),
    wherein the UE comprises a radio interface and processing circuitry, the UE's processing circuitry configured to perform aspects of example embodiments described throughout the present disclosure, including aspects related to the UE receiving the user data from the base station.

A-12. The communication system of embodiment A-11, further including the UE.

A-13. The communication system of embodiment A-12, wherein the cellular network further includes a base station configured to communicate with the UE.

A-14. The communication system of embodiment A-12 or A-13, wherein:
  the processing circuitry of the host computer is configured to execute a host application, thereby providing the user data; and
  the UE's processing circuitry is configured to execute a client application associated with the host application.

A-15. A method implemented in a user equipment (UE), comprising aspects of example embodiments described throughout the present disclosure, including aspects related to the UE receiving user data from a base station.

A-16. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE is configured to perform aspects of example embodiments described throughout the present disclosure, including aspects related to the UE receiving the user data from the base station.

A-17. The method of embodiment A-16, further comprising:
at the UE, receiving the user data from the base station.

A-18. A user equipment (UE) configured to communicate with a base station, the UE comprising a radio interface and processing circuitry configured to perform aspects of example embodiments described throughout the present disclosure, including aspects related to the UE transmitting user data to the base station.

A-19. A communication system including a host computer comprising:
a communication interface configured to receive user data originating from a transmission from a user equipment (UE) to a base station,
wherein the UE comprises a radio interface and processing circuitry, the UE's processing circuitry configured to perform aspects of example embodiments described throughout the present disclosure, including aspects related to the UE transmitting user data to the base station.

A-20. The communication system of embodiment A-19, further including the UE.

A-21. The communication system of embodiment A-20, further including the base station, wherein the base station comprises a radio interface configured to communicate with the UE and a communication interface configured to forward to the host computer the user data carried by a transmission from the UE to the base station.

A-22. The communication system of embodiment A-20 or A-21, wherein:
the processing circuitry of the host computer is configured to execute a host application; and
the UE's processing circuitry is configured to execute a client application associated with the host application, thereby providing the user data.

A-23. The communication system of embodiment A-20 or A-21, wherein:
the processing circuitry of the host computer is configured to execute a host application, thereby providing request data; and
the UE's processing circuitry is configured to execute a client application associated with the host application, thereby providing the user data in response to the request data.

A-24. A method implemented in a user equipment (UE), comprising aspects of example embodiments described throughout the present disclosure, including aspects related to the UE transmitting user data to a base station.

A-25. The method of embodiment A-24, further comprising:
providing user data; and
forwarding the user data to a host computer via the transmission to the base station.

A-26. A method implemented in a communication system including a host computer, a base station and a user equipment (UE), the method comprising:
at the host computer, receiving user data transmitted to the base station from the UE, wherein the UE is configured to perform aspects of example embodiments described throughout the present disclosure, including aspects related to the UE transmitting user data to the base station.

A-27. The method of embodiment A-26, further comprising:
at the UE, providing the user data to the base station.

A-28. The method of embodiment A-27, further comprising:
at the UE, executing a client application, thereby providing the user data to be transmitted; and
at the host computer, executing a host application associated with the client application.

A-29. The method of embodiment A-27, further comprising:
at the UE, executing a client application; and
at the UE, receiving input data to the client application, the input data being provided at the host computer by executing a host application associated with the client application,
wherein the user data to be transmitted is provided by the client application in response to the input data.

A-30. A base station configured to communicate with a user equipment (UE), the base station comprising a radio interface and processing circuitry configured to perform aspects of example embodiments described throughout the present disclosure, including aspects related to the base station receiving user data from the UE.

A-31. A communication system including a host computer comprising a communication interface configured to receive user data originating from a transmission from a user equipment (UE) to a base station, wherein the base station comprises a radio interface and processing circuitry, the base station's processing circuitry configured to perform aspects of example embodiments described throughout the present disclosure, including aspects related to the base station receiving user data from the UE.

A-32. The communication system of embodiment A-31, further including the base station.

A-33. The communication system of embodiment A-32, further including the UE, wherein the UE is configured to communicate with the base station.

A-34. The communication system of embodiment A-33, wherein:
the processing circuitry of the host computer is configured to execute a host application;
the UE is configured to execute a client application associated with the host application, thereby providing the user data to be received by the host computer.

A-35. A method implemented in a base station, comprising perform aspects of example embodiments described throughout the present disclosure, including aspects related to the base station receiving user data from a user equipment (UE).

A-36. A method implemented in a communication system including a host computer, a base station and a user equipment (UE), the method comprising:
at the host computer, receiving, from the base station, user data originating from a transmission which the base station has received from the UE, wherein one or both of the base station and the UE are configured to perform aspects of example embodiments described throughout the present disclosure, including aspects related to the base station receiving user data from the UE and/or aspects related to the UE transmitting user data to the base station.

A-37. The method of embodiment A-36, further comprising:
at the base station, receiving the user data from the UE.

A-38. The method of embodiment A-37, further comprising:
at the base station, initiating a transmission of the received user data to the host computer.

The invention claimed is:

1. A method in a user equipment (UE) of a wireless communications network, wherein the wireless communications network provides a radio connection of the UE to a base station comprising:
sending, to the base station, UE capability information indicative of multiple input multiple output (MIMO) related capabilities, the UE capability information being indicative of whether the UE needs to be configured with quasi colocation (QCL) Type D type of QCL by:
indicating a number of channel state information reference signals (CSI-RS) repetitions per resource set, the indicated number of repetitions indicating whether the UE needs to be configured with QCL Type D type;
receiving, from the base station, configuration information for a transmission configuration indication (TCI) state configuration associated to spatial quasi colocation assistance, the spatial QCL assistance being a QCL Type D source reference signal (RS) information indicative of whether a first and a second signal is to be received at the UE with the same beam or spatial filter; and
receiving, from the base station, physical download control channel (PDCCH) information to determine a physical download shared channel (PDSCH) scheduling referring to the TCI state.

2. The method of claim 1, wherein the PDCCH information comprises a download control indicator (DCI) containing information referring to a previously configured TCI state.

3. The method of claim 1, wherein the first signal is a channel state information reference signal (CSI-RS) signal and the second signal is a PDSCH De-Modulation Reference Signal (DMRS) signal.

4. The method of claim 1, wherein the UE capability information is indicative of information that the UE does not support receive (RX) beam sweeping using CSI-RS resource with repetition of the same transmit (TX) beam.

5. The method of claim 1, wherein the UE capability information is indicative of information that the UE does not support multiple beam switches in a slot.

6. The method of claim 1, wherein the UE receives physical download shared channel (PDSCH) signals using a receiver setting associated with the reception of the QCL Type D source RS as indicated by the TCI state.

7. The method of claim 6, wherein the receiver setting comprises a spatial RX filter setting.

8. The method of claim 1, wherein the UE capabilities comprise an indication that the UE does not need to be configured with QCL Type D type of QCL.

9. The method of claim 8, where the indication is valid for one or a plurality of defined frequency ranges.

10. The method claim 1, wherein the TCI state configuration is performed by radio resource control (RRC) signaling.

11. A user equipment (UE) comprising a processor configured to cause the UE to:
send, to a base station of a wireless communication network, UE capability information indicative of multiple input multiple output (MIMO) related capabilities, the UE capability information being indicative of whether the UE needs to be configured with quasi colocation (QCL) Type D type of QCL by:
indicating a number of channel state information reference signals (CSI-RS) repetitions per resource set, the indicated number of repetitions indicating whether the UE needs to be configured with QCL Type D type;
receive, from the base station, configuration information for transmission configuration indication (TCI) state configuration associated to spatial quasi co-location (QCL) assistance, the spatial QCL assistance being a QCL Type D source reference signal (RS) information indicative of whether a first and a second signal is to be received at the UE with the same beam or spatial filter; and
receive, from the base station, physical download control channel (PDCCH) information, to determine a PDSCH scheduling referring to the TCI state.

12. A method in a base station of a wireless communications network, wherein the wireless communications network provides a radio connection of a user equipment (UE) to the base station, the method comprising:
receiving, from the UE, UE capability information indicative of multiple input multiple output (MIMO) related capabilities, the UE capability information being indicative of whether the UE needs to be configured with quasi colocation (QCL) Type D type of QCL by:
indicating a number of channel state information reference signals (CSI-RS) repetitions per resource set, the indicated number of repetitions indicating whether the UE needs to be configured with QCL Type D type;
determining that the UE needs spatial quasi co-location (QCL) assistance, the spatial QCL assistance being a QCL Type D source RS information indicative of whether a CSI-RS and a PDSCH DMRS signal is to be received with the same beam or spatial filter; and
sending, to the UE, configuration information for a transmission configuration indication (TCI) state configuration associated to spatial QCL assistance.

13. The method of claim 12, further comprising detecting, from the UE capability information, that the UE does not support receiving (RX) beam sweeping using CSI-RS resource with repetition of the same transmission (TX) beam.

14. The method of claim 12, further comprising detecting, from the UE capability information, that the UE does not support multiple beam switches in a slot.

15. The method of claim 12, further comprising transmitting physical download shared channel (PDSCH) signals associated to the TCI state.

16. The method of claim 15, wherein the TCI state is indicative to using RS as source QCL Type C and Type D.

17. The method of claim 12, wherein the UE capabilities comprise an indication that the UE does not need to be configured with QCL Type D type of QCL.

18. The method of claim 17, where the indication is valid for one or a plurality of defined frequency ranges.

19. The method of claim 12, wherein the TCI state configuration is performed by RRC signaling.

20. A base station comprising a processor configured to cause the base station to:
    receive, from a user equipment (UE), UE capability information indicative of multiple input multiple output (MIMO) capabilities, the UE capability information being indicative of whether the UE needs to be configured with quasi colocation (QCL) Type D type of QCL by:
        indicating a number of channel state information reference signals (CSI-RS) repetitions per resource set, the indicated number of repetitions indicating whether the UE needs to be configured with QCL Type D type;
    determine that UE needs spatial QCL assistance; and
    send, to the UE, configuration information for a transmission configuration indication (TCI) state configuration associated to spatial quasi co-location (QCL) assistance, the spatial QCL assistance being a QCL Type D source RS information indicative of whether a CSI-RS and a PDSCH DMRS signal is to be received with the same beam or spatial filter.

* * * * *